US008503390B2

(12) United States Patent
Chen (10) Patent No.: US 8,503,390 B2
(45) Date of Patent: Aug. 6, 2013

(54) METHOD AND SYSTEM FOR SCANNING IN WLAN

(75) Inventor: Ling Chen, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 1144 days.

(21) Appl. No.: 12/442,312

(22) PCT Filed: Sep. 19, 2007

(86) PCT No.: PCT/EP2007/059903
§ 371 (c)(1),
(2), (4) Date: Mar. 20, 2009

(87) PCT Pub. No.: WO2008/034846
PCT Pub. Date: Mar. 27, 2008

(65) Prior Publication Data
US 2010/0027519 A1    Feb. 4, 2010

(30) Foreign Application Priority Data

Sep. 20, 2006  (CN) .......................... 2006 1 0113229

(51) Int. Cl.
*H04L 12/56*       (2006.01)
(52) U.S. Cl.
USPC ......................................... 370/331; 370/252
(58) Field of Classification Search
USPC ................................................ 370/252, 331
See application file for complete search history.

(56) References Cited

U.S. PATENT DOCUMENTS

| 7,103,636 | B2 * | 9/2006 | Glasco ........................... 709/206 |
| 7,286,515 | B2 * | 10/2007 | Olson et al. ................... 370/338 |
| 7,362,756 | B2 * | 4/2008 | Choi et al. ..................... 370/389 |
| 7,370,362 | B2 * | 5/2008 | Olson et al. ...................... 726/25 |
| 7,376,398 | B2 * | 5/2008 | Roy et al. ....................... 455/101 |
| 7,403,506 | B2 * | 7/2008 | Lee et al. ....................... 370/331 |
| 7,417,971 | B2 * | 8/2008 | Jeong et al. .................... 370/331 |

(Continued)

OTHER PUBLICATIONS

Speicher et al., "Fast MAC-Layer Scanning in IEEE 802.11 Fixed Relay Radio access Networks," Networking, International Conference on Systems and International Conference on Mobile Communicaitons and Learning Technologies, 2006, International Conference on Morne, Mautitius Apr. 23-29, 2006, pp. 144-144.

(Continued)

*Primary Examiner* — Jay P Patel
(74) *Attorney, Agent, or Firm* — Staas & Halsey LLP (57) ABSTRACT

The embodiments disclose a method for scanning in a radio communication system, in particular in a WLAN (Wireless Local Area Network), including transmitting by a MS on all channels a probe message containing the IP address of the original AP of the MS and an MAC address of the MS; switching to the original channel; transmitting a response inquiry message to the original AP; and receiving a probe response message within a predetermined period, wherein, if the AP of the probe message received on the channel is not the original AP, then the AP transmits the probe response message containing the MAC address to the original AP according to the IP address; and the original AP buffers the probe response message received, and transmits the probe response message to the MS according to the MAC address after the response inquiry message sent by the MS has been received. The embodiments further disclose a scanning system in a WLAN. By using the method and system, not only the time delay during the scanning is reduced, but also the network security is improved and the difficulty for realization is decreased.

10 Claims, 7 Drawing Sheets

(56) References Cited

U.S. PATENT DOCUMENTS

| | | | |
|---|---|---|---|
| 7,634,230 B2* | 12/2009 | Ji et al. | 455/41.2 |
| 7,676,216 B2* | 3/2010 | Stieglitz et al. | 455/410 |
| 7,936,726 B2* | 5/2011 | Fiat et al. | 370/332 |
| 8,054,798 B2* | 11/2011 | Jeong et al. | 370/331 |
| 8,059,581 B2* | 11/2011 | Gillies et al. | 370/328 |
| 8,131,291 B2* | 3/2012 | Jeong et al. | 455/434 |
| 2004/0255002 A1* | 12/2004 | Kota et al. | 709/213 |
| 2005/0128999 A1* | 6/2005 | Kwon et al. | 370/349 |
| 2005/0143073 A1* | 6/2005 | Lee et al. | 455/436 |
| 2005/0213524 A1* | 9/2005 | Doragh et al. | 370/311 |
| 2005/0232200 A1* | 10/2005 | Jeong et al. | 370/331 |
| 2005/0265287 A1* | 12/2005 | Lee et al. | 370/331 |
| 2006/0056348 A1* | 3/2006 | Marinier et al. | 370/331 |
| 2006/0057964 A1* | 3/2006 | Roy et al. | 455/67.11 |
| 2006/0062183 A1* | 3/2006 | Forte et al. | 370/331 |
| 2006/0092888 A1* | 5/2006 | Jeong et al. | 370/338 |
| 2006/0111103 A1 | 5/2006 | Jeong et al. | |

OTHER PUBLICATIONS

M. Shin, et al., "Improving the Latency of the Probe Phase During 802.11 Handoff," IEEE 802.11-03/417RO, May 2003.

\* cited by examiner

METHOD AND SYSTEM FOR SCANNING IN WLAN

CROSS REFERENCE TO RELATED APPLICATIONS

This application is based on and hereby claims priority to International Application No. PCT/EP2007/059903, filed on Sep. 19, 2007, and Chinese Application No. 200610113229.1, filed Sep. 20, 2006, the contents of both of which are hereby incorporated by reference.

BACKGROUND

1. Field

The embodiments discussed herein relate to the technical field of a radio communication system, in particular in the technical field of WLAN (Wireless Local Area Network), and specifically to a method and a system for scanning in a radio communication system.

2. Description of the Related Art

While a mobile station (MS) roams in a WLAN, when the quality of the communication between the MS and an access point (AP) deteriorates to a certain degree, the MS will switch from the original AP to a new AP. During the process for the MS to switch the AP, if the MS is performing a real-time application service, it is desirable that the influence made by the switching to the MS is as small as possible, including the time delay during the switching being as small as possible. The time delay during switching includes mainly three parts: a detection latency, a scanning latency and an association/authentication latency. Currently, the detection latency and the association/authentication latency have been reduced to an accepted degree, while the scanning latency still is a problem to be solved.

The scanning latency takes about 90% of the whole switching process, and more importantly, the absolute value of the scanning latency is very big, which is from 150 ms to 500 ms or more. This is not acceptable to a real-time application service. The problem of the scanning latency originates from the IEEE 802.11 specifications which suggests that when switching an AP, an MS should transmit a probe message on all channels one by one, and stop communicating with the original AP to wait for a probe response message. Only when all probe response messages are received, can the MS select a new AP among all the APs probed. Since the Max Channel Time for waiting for each of the probe response message is 10~100 ms, and the typical value of the Max Channel Time is 50 ms, then the time for waiting for all probe response messages is n*Max Channel Time, where n is the number of the channels probed. In the IEEE 802.11b specifications, the value of n is 14; in the IEEE 802.11a/g specifications, the value of n is 52. It can be seen that, according to the proposals in the IEEE 802.11 specifications, the scanning latency for an MS during its switching will be very big, which will affect the normal operation of the MS and the system.

Figure 1:
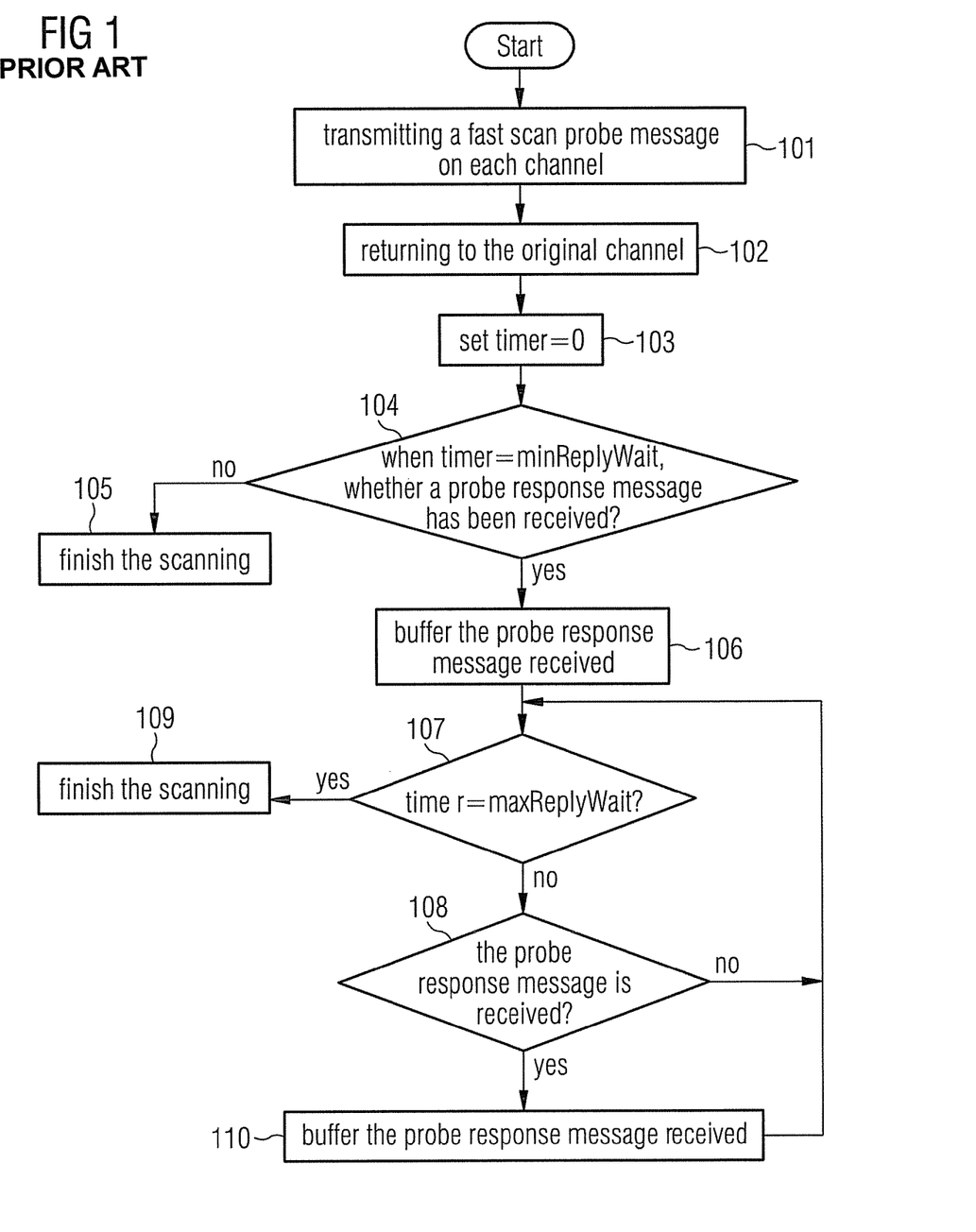
FIG. 1 is a flowchart of the FMLS method on the MS side.

In order to reduce the scanning latency, a method of Fast MAC-Layer Scanning (FMLS) has been proposed, and FIG. 1 is a flowchart of the FMLS method from the MS side. When an MS starts a scanning probe, first it transmits a fast scan probe message on each of the channels sequentially in the step 101. The difference from an ordinary scan probe message is that the fast scan probe message contains a Fast-Scan Information Element (FSIE), and the FSIE contains an Internet Protocol (IP) address and the response latency information of the MS. After having transmitted the fast scan probe message on each channel, the MS returns to the original channel in the step 102, so that the MS can continue communicating with the original AP while waiting for the probe response message based on the IP. Then, in the step 103, the MS initializes a timer, that is, to set the timer to zero, and starts timing. Two time points for waiting for the probe response message are pre-set in the MS, they are the minimum waiting time (minReplyWait) and the maximum waiting time (maxReplyWait) respectively, and the minReplyWait is less than the maxReplyWait. In the step 104, when the timing by the timer reaches the minReplyWait, if the MS has not received any probe response message, which indicates that no available network has been found, the scanning is stopped in the step 105; if the MS has received a probe response message, then in the step 106 the received probe response message is buffered and the timing continues. Then, it is decided in the step 107 whether the timer has reached the maxReplyWait. If the timer has reached the maxReplyWait, the scanning stops in the step 109; otherwise it continues in the step 108 to decide whether the probe response message is received. If the probe response message is received, the received probe response message is buffered in the step 110; otherwise it returns to the step 107 and continues to decide whether the timer has reached the maxReplyWait.

After the timer has reached the maxReplyWait, the scanning is stopped, and the signal to noise ratios (SNR) of the fast scan probe messages in all the probe response messages are compared, and the AP corresponding to the probe response message having the biggest SNR is selected as the new AP.

Figure 2:
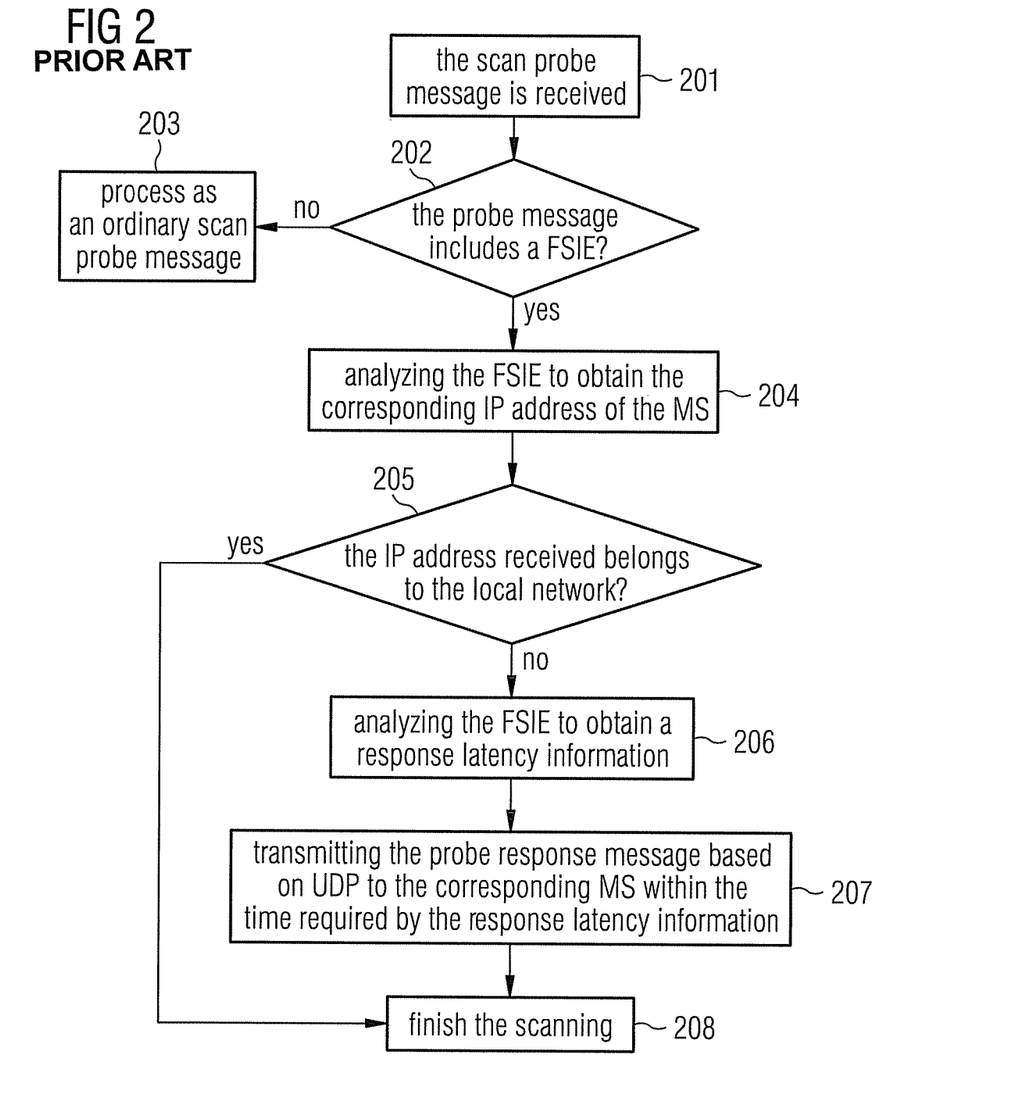
FIG. 2 is a flowchart of the FMLS method on the network side.

The above method is the FMLS method used from the MS side, a corresponding method is also carried out on the network side, and FIG. 2 is a flowchart of the FMLS method on the network side. In the step 201, if the AP receives a scan probe message transmitted by the MS on the channel used by it, the AP is called as a probed AP, and then in the step 202, it is detected whether the probe scan message has the FSIE. If the scan probe message received does not have the FSIE, then in the step 203, it is processed as an ordinary scan probe message. If the scan probe message received contains the FSIE, which indicates that this probe message is a fast scan probe message, and in the step 204 the FSIE is parsed to obtain the IP address therein. The IP address is that of the MS which transmits the scan probe message. Then, in the step 205, it is continued to decide whether the IP address obtained belongs to the local network. If the IP address belongs to the local network, it proceeds to the step 208 to stop the scanning. If the IP address does not belong to the local network, then in the steps 206 to 208, it continues to parse the FSIE to obtain the response latency information; according to the time required by the response latency, a probe response message based on a User Datagram Protocol (UDP) is transmitted to the MS corresponding to the IP address. The probe response message contains therein the SNR obtained by the probed AP by the measurement according to the fast scan probe message received thereby.

Since the probed AP, that is, the AP which receives the fast scan probe message, can communicate with the original AP of the MS based on an IP route, therefore, the AP that is probed by scanning by the MS transmits the probe response message to the MS by the original AP of the MS via the IP route.

Different from the scanning process required by the 802.11 specifications, when using the above FMLS method, the MS switches back to the original channel to continue communicating with the original AP after having transmitted the fast scan probe message sequentially to all the channels, so that the latency of the n*MaxChannelTime is reduced, and the scanning latency is significantly shorted. However, there are problems in the FMLS method, first, the AP probed needs to wait according to the response latency information after the fast scan probe message has been received, and the probe response message can be transmitted only within the time required by the response latency. The reason for setting the response latency is that the MS transmits the fast scan probe message on each channel in sequence, therefore, when the MS has not finished probing all the channels, it is possible that a certain AP has already received the fast scan probe message. If the AP transmits the probe response message immediately, the MS has not yet switched back to the original channel at that moment therefore the MS cannot communicate with the original AP, then the MS cannot receive the probe response message transmitted by the AP. The response latency is set to avoid losing the probe response message, but it also increases the scanning latency. Secondly, the another AP probed transmits the probe response message to the MS via the IP route, which will not only greatly reduce the network security, but also is hard to realize.

SUMMARY In view of what described above, the solution by the embodiments discussed herein to the technical problem is to provide a method and a system for scanning in a radio communication system, in particular for a WLAN, and compared to the prior art, by using the method and system of the embodiments not only the time delay of scanning is further reduced, but also the network security is improved and the difficulty in its realization is reduced.

For this purpose, the technical solution provided by the present embodiments can be as follows.

A method for scanning in a radio communication system, including: transmitting by a mobile station MS on all channels a probe message containing an Internet Protocol IP address of the original access point AP of the MS and a medium access control MAC address of the MS; switching to an original channel; transmitting a response inquiry message to the original AP, and receiving a probe response message within a predetermined period; wherein if the AP of the probe message received on the channel is not the original AP, the AP transmits a probe message containing the MAC address to the original AP according to the IP address; the original AP buffers the probe response message received, and transmits the probe response message to the MS according to the MAC address after the response inquiry message sent by the MS has been received.

Wherein, it further includes if the AP of the probe message received on the channel is the original AP, then the original AP buffers the probe response message generated thereby, and transmits the probe response message to the MS according to the MAC address after the response inquiry message sent by the MS has been received.

Wherein, it further includes the MS selects an AP corresponding to a channel with the best signal quality as a new AP based on the signal quality information in the probe response message.

Wherein the signal quality information includes signal strength or a signal to noise ratio.

Wherein, it further includes the original AP receives the response inquiry message transmitted by the MS and transmits an inquiry response message to the MS; and if the inquiry response message from the original AP is not received by the MS within the predetermined period, the response inquiry message is retransmitted by the MS to the original AP.

Wherein, it further includes if the number of times for the MS to transmit the response inquiry message reaches a predetermined value, then the transmitting of the response inquiry message stops.

According to the above method, the embodiments also propose a system for scanning in a radio communication system, including a MS, an original AP of the MS and another AP to be probed, wherein the MS comprises: a probe message transmitting unit, for transmitting on all channels a probe message containing an IP address of the original AP of the MS and a MAC address of the MS; a switching unit, for switching to an original channel after the probe message has been transmitted on all the channels; an inquiry unit, for transmitting a response inquiry message to the original AP on the original channel; and a probe response message receiving unit, for receiving a probe response message within a predetermined period; the original AP of the MS includes: a storage unit, for buffering the probe response message; a response message unit, for transmitting the probe message to the MS according to the MAC address after containing received the response inquiry message sent by the MS. The another AP probed includes: a probe message receiving unit, for receiving the probe message containing the IP address of the original AP of the MS and the MAC address of the MS transmitted by the MS; and a probe response message unit, for transmitting the probe response message containing the MAC address to the original AP of the MS according to the IP address.

Wherein the MS further includes: a new AP selecting unit, for selecting the AP probed having the best signal quality as the new AP according to signal quality information in the probe response message.

Wherein the signal quality information comprises signal strength or a signal to noise ratio.

Wherein, the original AP of the MS further comprises an inquiry response unit, the MS further includes a retransmitting unit; the inquiry response unit is for transmitting the inquiry response message to the MS after the response inquiry message transmitted by the MS has been received; and the retransmitting unit is for retransmitting the response inquiry message to the original AP if the inquiry response message from the original AP has not been received within the predetermined period.

Wherein, the retransmitting unit further includes: a stopping unit, for stopping the transmitting of the response inquiry message if the number of the times of transmitting the response inquiry message reaches a predetermined value. In the embodiments, an MS transmits on all channels a probe message containing an IP address of the original AP of the mobile station and a MAC address of the MS, switches to an original channel, transmits a response inquiry message to the original AP, and receives a probe response message within a predetermined period; if the AP of the probe message received on the channel is not the original AP, the AP transmits a probe message containing the MAC address to the original AP according to the IP address; the original AP buffers the probe response message received, and transmits the probe response message to the MS according to the MAC address after the response inquiry message sent by the MS has been received. It can be seen here that after the other probed AP has received the probe message, there is no need to wait for the time delay, then a probe response message can be sent out immediately, so as to reduce the time delay of the whole scanning process. When a probe response message reaches the original AP of the MS ahead of the response inquire message of the MS, the original AP buffers the probe response message until the response inquire message of the MS is received, so as to avoid losing the probe response message. Furthermore, the probed AP does not transmit the probe response message to the MS via the IP route, instead, it first transmits the probe response message to the original AP of the MS via the IP route, then the probe response message is transmitted by the original AP to the MS according to the MAC address, so as to improve the network security.

In the embodiments, it is further considered that when the MS is scanning each of the channels, the communication quality between the MS and the original AP is very low, therefore, messages may be lost when the MS is transmitting the response inquiry message to the original AP, therefore the retransmitting mechanism is introduced to ensure the reliability of the message transmission.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

A core concept of the embodiments is that: the MS transmits on all channels a probe message containing the IP address of the original AP of the MS and the MAC address of the MS, switches to the original channel, transmits the response inquiry message to the original AP, and receives the probe response message within a predetermined period; if the AP receiving the probe message on the channel is not the original AP, then that AP transmits the probe response message containing the MAC address to the original AP according to the IP address; the original AP buffers the probe response message received by it, and transmits the probe response message to the MS according to the MAC address after the response inquiry message sent by the MS has been received. Therefore, the time delay of the whole scanning process is reduced, and the network security is improved.

Hereinafter the method is further described with reference to an embodiment.

Figure 4:
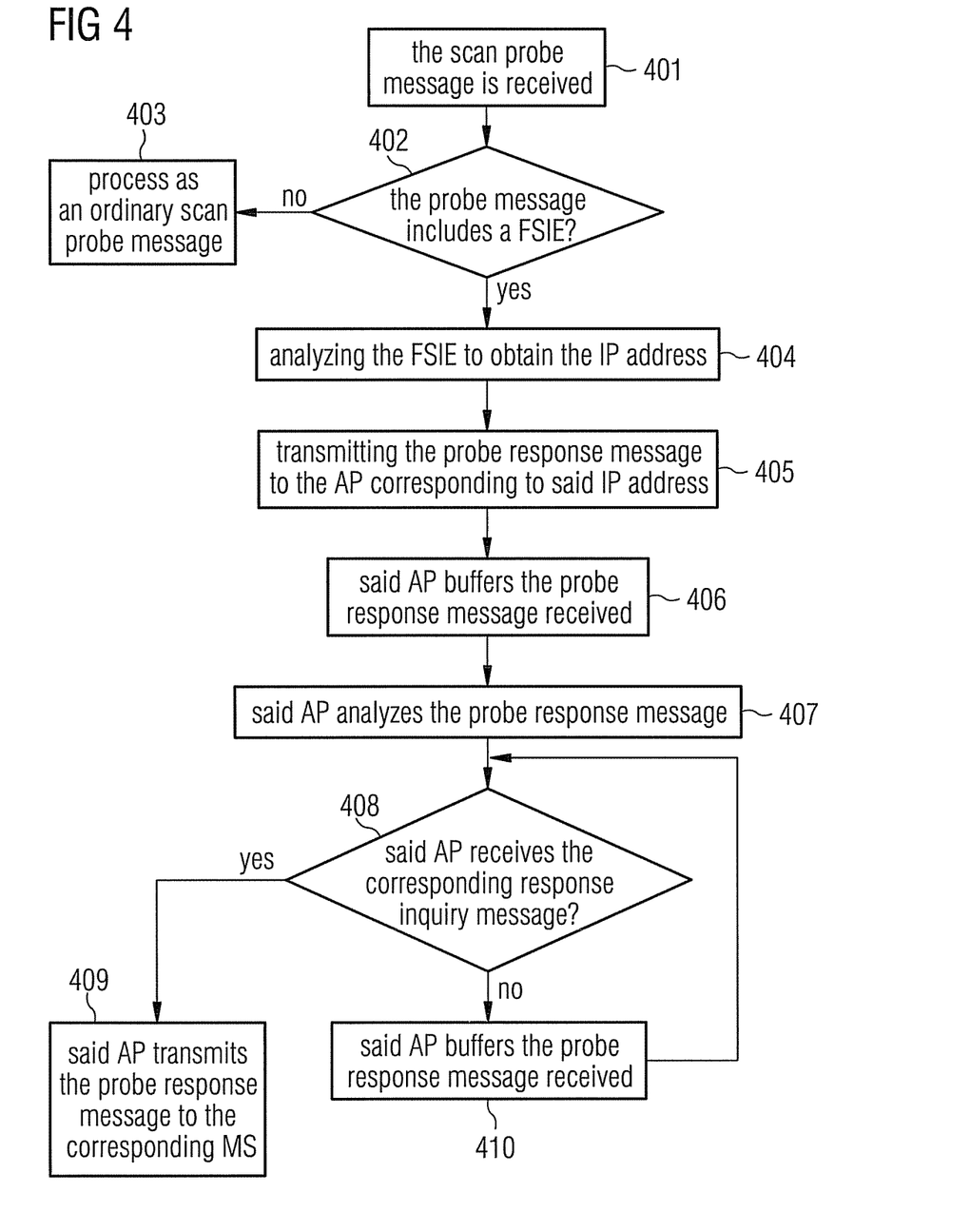
FIG. 4 is a flowchart of the scan probe response method on the network side in the embodiments.

An MS roams in a WLAN and when the communication quality between the MS and the original AP decreases to a certain degree, the MS will switch from the original AP to a new AP. After a switching process is activated, the MS will perform a scan probing process, and FIG. 4 shows the flowchart of the scan probe response method on the MS side in the present invention.

When the MS starts the scan-probing, it first transmits in the step 301 (FIG. 3) a fast scan probe message on each of the channels in sequence. The difference from the current scan probe message is that the FSIE contains the MAC (Medium Access Control) address of the MS and the IP address of the original AP of the MS, but does not contain the IP address and the response latency information of the MS. Since at the time the MS was connected the original AP, according to the requirements of the IEEE 802.11 specifications, the original AP has informed the MS of it IP address, the IP address of the original AP has therefore already been obtained and stored when the MS was connected to the original AP.

Figure 3:
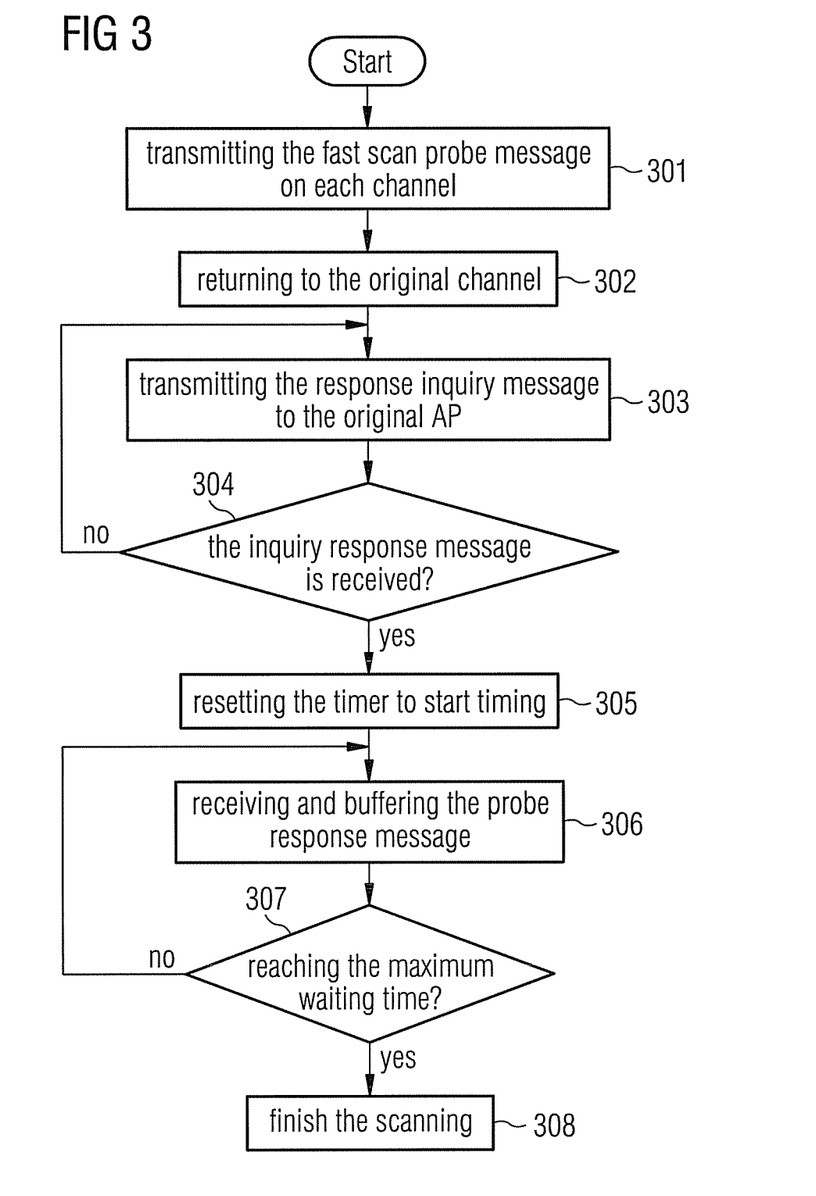
FIG. 3 is a flowchart of the scan probe method on the MS side in the embodiments.

The MS returns to the original channel in the step 302 after having transmitted the fast scan probe message to each channel.

Then, in the step 303, the MS transmits a response inquiry message to the original AP via the original channel, and inquiries of the original AP whether the probe response message is received; and waits for the inquiry response message from the original AP. Then in the step 304 it decides whether the inquiry response message is received.

If the MS does not received the inquiry response message within a predetermined period, which indicates that the original AP has not received the response inquiry message, then the MS continues to transmit the response inquiry message to the original AP. Where the number of times that the MS retransmits the response inquiry message to the original AP is determined by specified requirements or simulation.

If the MS receives the inquiry response message within a predetermined period which indicates that the original AP has received the response inquiry message, then in the step 305 (FIG. 3), the MS sets a timer to zero to start timing, and receives and buffers the probe response message transmitted by the original AP in the step 306; in the step 307, the MS decides whether the timer reaches a pre-set maximum waiting time maxReplyWait, that is, whether the timer exceeds or equals to the maxReplyWait.

If it has reached the maximum waiting time, the MS performs the step 308 and finishes the scanning; otherwise, the MS continues to receive and buffer the probe response message from the original AP.

After the scanning is finished, the MS can compare the signal quality information in all of the probe response messages, and select the AP corresponding to the probe response message with the best signal quality as a new AP. If the MS has not received any probe response message, which indicates that there is no AP available, then the MS stops the switching and continues to communicate with the original AP.

In the above method, after the MS has transmitted the response inquiry message to the original AP, only after the inquiry response message from the original AP has been received, the MS begins to receive the probe response message; if the inquiry response message from the original AP is not received, it retransmits the response inquiry message. In practice, after having transmitted the response inquiry message to the original AP, the MS can also start timing and receiving the response inquiry message transmitted by the original AP without receiving the inquiry response message from the original AP. However, the reliability of the message transmission will be reduced.

The above-described method is the scan probe method used by MS side in the present invention, a corresponding method is to be performed on the network as well, and when the AP receiving the scan probe message is not the original AP, FIG. 4 is a corresponding flowchart of the scan probe response method on the network side.

In the step 401, if the probed AP receives a scan probe message transmitted by the MS on the channel used by it, then in the step 402 it detects whether the scan probe message contains the FSIE. If the scan probe message received does not contain the FSIE, then in the step 403 it processes the scan probe message as an ordinary scan probe message. If the scan probe message received contains the FSIE, which indicates that the probe message is a fast scan probe message, then it analyzes the FSIE in the step 404 to obtain the IP address thereof. The IP address is that of the original AP of the MS transmitting the scan probe message.

In the step 405, the probed AP transmits a probe response message to the AP corresponding to the IP address without waiting for a time delay. The probe response message contains the signal quality information of the fast scan probe message and the MAC address of the MS.

When the original AP receives the probe response message, it buffers, in the step 406, the probe response message received; and in the step 407 (FIG. 4), it analyzes the probe response message to obtain the MAC address of the MS, so that the original AP knows to which MS the probe response message should be transmitted. Then, in the step 408, the original AP inquires whether a response inquiry message transmitted by the MS is received. If the original AP has received the response inquiry message transmitted by the MS, in the step 409 the original AP transmits the corresponding probe response message received to the MS according to the MAC address of the MS; otherwise, the original AP buffers the corresponding probe response message received in the step 410. Then, it continues inquiring whether the response inquiry message transmitted by the MS is received, until the response inquiry message transmitted by the MS is received.

It can be seen from the above-described method, that if the AP having received the probe message is not the original AP of the MS, but the AP according to the IP address, the probe response message containing the MAC address is transmitted to the original AP of the MS; the original AP of the MS buffers the probe response message received by itself, and transmits the probe response message to the MS according to the MAC after the response inquiry message transmitted by the MS has been received.

The original AP of the MS can also generate a response message and directly buffers the probe response message after the probe message has been received by the original AP of the MS, so that it further transmits the probe response message to the MS according to the MAC address after the response inquiry message transmitted by the MS has been received. The useful effect of having the original AP of the MS to perform the operation is that after the scanning is finished the MS can compare the signal quality information of all the probe response messages, including the signal quality information of the original AP, so as to avoid any unnecessary switching according to the results of the signal quality comparison.

Hereinbefore is a specific description of the scanning method in the WLAN, it can be seen that, the method is completed from both the MS side and the network side, and it includes the scan probe method on the MS side and the scan probe response method on the network side. Hereinafter will explain the method in more detail.

Figure 5:
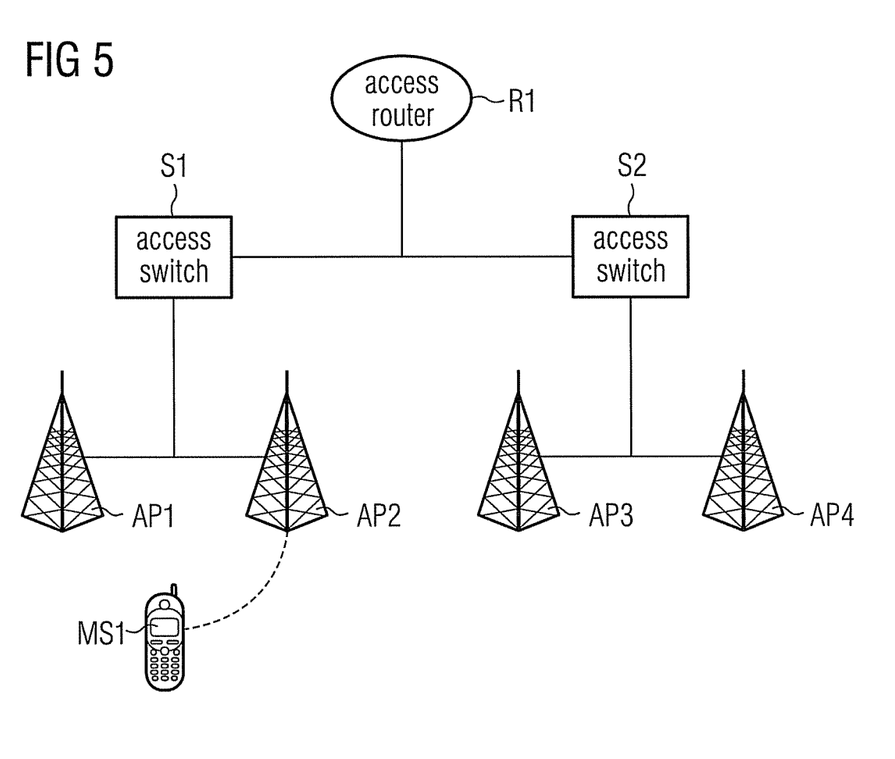
FIG. 5 is an illustrative diagram of the network configuration of a WLAN.

FIG. 5 is an illustrative diagram of the network configuration of a WLAN, in which access points AP1 and AP2 are physically connected, and both are physically connected to a switch S1; access points AP3 and AP4 are physically connected, and both are physically connected to a access switch S2; the access switch S1 and S2 are connected, and both are connected to a router R1. It is assumed that a mobile station MS1 is currently located in the service range of the AP2, the MS1 communicates with the AP2 via a channel 4, then the AP2 is the original AP of the MS1, and the channel 4 is the original channel of the MS1.

The MS1 roams in a WLAN, when the communication quality between the MS1 with the AP2 deteriorates to a certain degree, the MS1 will switch from the AP2 to a new AP. The MS1 transmits a fast scan probe message on each channel in sequence, assuming that the IEEE 802.11b is followed, then the MS1 needs to transmit the fast scan probe message on 14 channels in sequence, the fast scan probe message contains a MAC address of the MS1 and a IP address of the AP2, but does not contain the IP address and the response latency information of the MS1. The MS1 switches back to the channel 4 after having transmitted the fast scan probe message on all channels, so that it can continue communicating with the AP2.

The MS1 transmits the response inquiry message to the AP2 to inquire from the AP2 whether the probe response message is received; and it waits for the inquiry message from the AP2, and decides whether the probe response message is received. Assuming the MS1 does not receive the inquiry response message within 0.1 ms, which indicates that the response inquiry message is not received by the AP2, the MS continues to transmit the response inquiry message to the AP2, assuming the MS can retransmit the response inquiry message to the AP2 5 times.

If the MS1 receives the inquiry response message within 0.1 ms, which indicates that AP2 has received the response inquiry message, the MS1 resets the timer to start timing, and begins to receive and buffer the probe response message transmitted by the AP2. At the same time, the AP2 monitors the timer, and decides whether the maximum waiting time is reached, assuming the maximum waiting time is 1 ms. If the time for the MS1 to receive and buffer the probe response message reaches 1 ms, then the MS1 finishes the scanning; otherwise, the MS1 continues to receive and buffer the probe response message from the AP2.

On the network side, assuming the AP3 uses the channel 6, and AP3 receives the scan probe message transmitted by the MS1 on the channel 6, then the AP3 detects whether the probe scan message contains a FSIE. If the scan probe message received does not contain the FSIE, it is processed as an ordinary scan probe message. If the scan probe message received contains the FSIE, then it indicates that the probe message is the fast scan probe message, the FSIE thereof is analyzed to obtain the IP address therein, and the IP address is the IP address of the AP2.

The AP3 directly transmits the probe response message to the AP2 without waiting for the time delay. The probe response message contains the signal quality information of the fast scan probe message, and the MAC address of the MS1. Wherein, the signal quality of the fast scan probe message is obtained by the AP3 by computing according to the fast scan probe message received, which is either strength information of the message signal or an SNR of the message signal.

Hereinabove, AP3 is used by way of example to explain the method for the probed AP to transmit the probe response message, the method is the same as to the other probed AP, and the explanation is not repeated here.

When the AP2 receives the probe response message from the AP3, it buffers and analyzes the probe response received to obtain the MAC address of the MS1, so that the AP2 knows that the probe response message should be transmitted to the MS1. Then the AP2 inquiries whether a response inquiry message transmitted by the MS1 is received. If the AP2 has received the response inquiry message transmitted by the MS1, the corresponding probe response message received is transmitted to the MS1 according to the MAC address of the MS1; otherwise, the AP2 buffers the received probe response message, which is the feedback to the MS1. Then, the AP2 continues to inquire whether the response inquiry message transmitted by the MS1 is received, until the response inquiry message transmitted by the MS1 is received.

In the MS1, if it reaches the maximum waiting time, then the MS1 finishes the scanning. Now it is assumed that the MS1 receives the probe response message from the channel 6, the channel 3 and the channel 14 after the scanning being finished. Wherein, the channel 6, the channel 3 and the channel 14 correspond to AP3, AP1 and AP4 respectively. The MS1 will compare the signal quality information of each of the probe response message, assuming the signal quality of the probe response message from the channel 3 is the best, then the MS1 selects the AP1 corresponding to the probe response message from the channel 3 as a new AP.

If the MS1 has not received the probe response message, which indicates that no available AP is found, then the MS1 stops switching and continues communicating with the AP2.

It can be seen that, when using the method to scan, the probed AP, after having received the scan probe message, can transmit the probe response message immediately without waiting for a time delay, so that the time delay of the whole scanning is reduced. When the probe response message reaches the original AP of the MS prior to the MS, the original AP will buffer the probe response message, until the MS transmits a message to inquire, so as to avoid losing the probe response message.

Moreover, the probed AP does not transmit the probe response message directly to the MS via the IP route, instead it first transmits the probe response message to the original AP of the MS via the IP route, then the probe response message is transmitted to the MS by the original AP via the MAC address, so that the network security is improved.

In the embodiments, it is considered that when the MS is scanning each channel, the quality of the communication between the MS and the original AP is already very low, the message may be lost when the MS is transmitting the response inquiry message to the original AP, therefore the retransmitting mechanism is introduced to enhance the reliability of the message transmission.

Based on the above method, the embodiments further include a system for scanning in a WLAN. Hereinafter the system is further explained.

Figure 6:
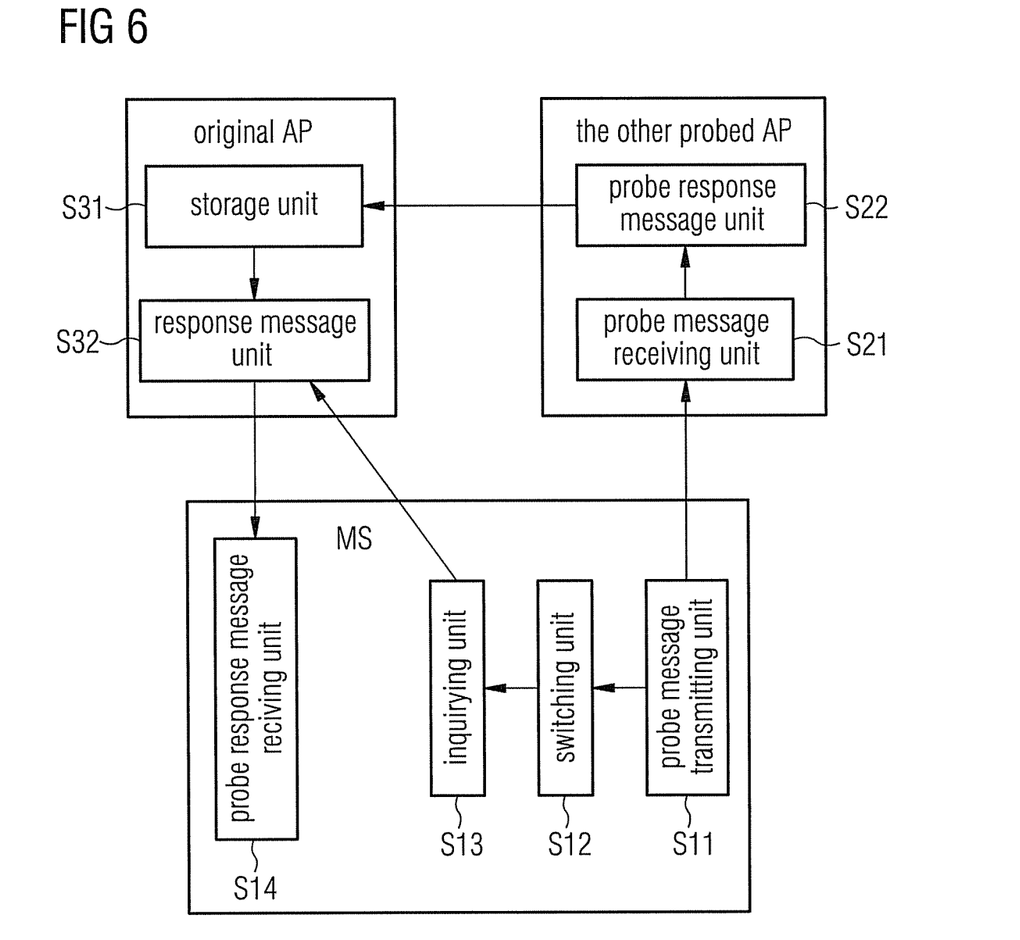
FIG. 6 is an illustrative diagram of the scan probe system in the embodiments.

FIG. 6 is an illustrative diagram of the system, which includes: a MS, another probed AP and an original AP of the MS. Wherein, the MS includes a probe message transmitting unit S11, a switching unit S12, an inquiring unit S13 and a probe response message receiving unit S14; the another probed AP includes a probe message receiving unit S21 and a probe response message unit S22; the original AP of the MS includes a storage unit S31 and a response message unit S32.

When the MS starts scan-probing, firstly, it fast transmits the scan probe message by the probe message transmitting unit S11 on each channel in sequence, the fast scan probe message transmitted by the probe message transmitting unit S11 includes a FSIE, and the FSIE includes the MAC address of the MS and the IP address of the original AP of the MS, but does not include the IP address and the response latency information of the MS.

The MS switches back to the original channel via the switching unit S12 after having transmitted the fast scan probe message on each channel. Next, the MS transmits a response inquiry message to the original AP via the inquiring unit S13. Then the MS receives the probe response message transmitted by the original AP via the probe response message receiving unit S14 within a predetermined period.

The other probed AP receives the scan probe message transmitted by the MS on the channel used by itself via the probe message receiving unit S21, then it detects whether the scan probe message contains a FSIE. If the scan probe message received does not contain the FSIE, it processes the scan probe message as an ordinary scan probe message. If the received scan probe message contains the FSIE, which indicates that the probe message is a fast scan probe message, the other probed AP will parse the FSIE to obtain the IP address therein. The IP address is the IP address of the original AP of the MS transmitting the scan probe message. Then the other probed AP via the probe response message unit S22 immediately transmits a probe response message to the AP corresponding to the IP address without waiting for a time delay. The probe response message contains the signal quality information of the fast scan probe message and the MAC address of the MS.

The original AP will buffer the probe response message via the storage unit S31, and will analyze the probe response message to obtain the MAC address of the MS, so that the original AP knows to which MS the probe response message should be transmitted. Wherein, the probe response message is either the probe response message transmitted by the other probed AP, or the probe response message generated by the original AP after it has received the probe message. The original AP inquiries via the response message unit S32 whether a response inquiry message transmitted by the MS is received, if the response inquiry message transmitted by the MS has been received, the corresponding probe response message received is transmitted to the MS according to the MAC address of the MS. If the response inquiry message transmitted by the MS has not been received, it continues inquiring whether the response inquiry message transmitted by the MS is received, until the response inquiry message transmitted by the MS is received.

Figure 7:
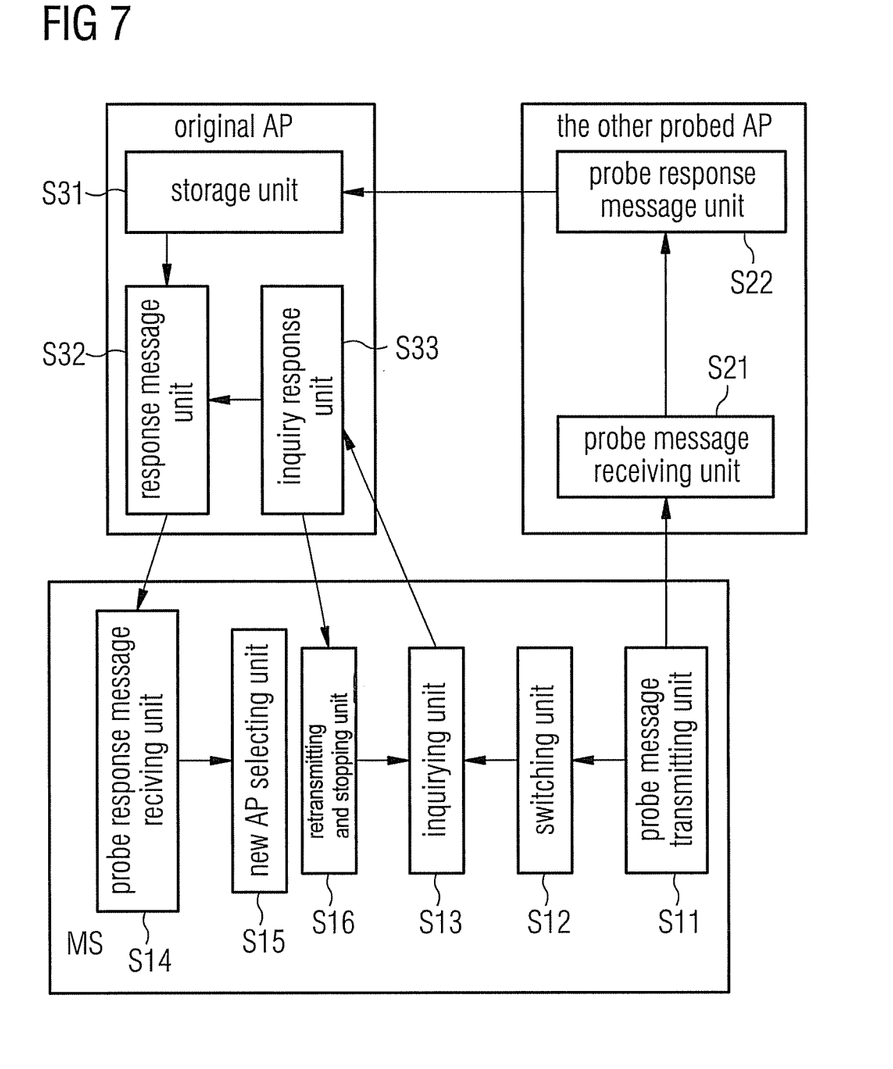
FIG. 7 is another illustrative diagram of the scan probe system in the embodiments.

In order to improve the reliability of the message transmission and to make the system perfect, the embodiments also include another system for scanning in a WLAN, and FIG. 7 is an illustrative diagram of the system.

Compare to the system showed in FIG. 6, it is added in the MS a new AP selecting unit S15, and after the completion of the scanning, the MS compares the signal quality information of all probe response message via the new AP selecting unit S15, and selects an AP corresponding to the probe response message with the best signal quality as a new AP. If the MS does not receive the probe response message which indicates that no available AP is found, then the MS stops switching and continues communicating with the original AP.

A retransmitting and stopping unit S16 is also added in the MS, and the retransmitting unit S16 further includes a stopping operation. After the MS transmits the response inquiry message to the original AP via the inquiring unit S13, the retransmitting and stopping unit S16 waits for the inquiry message from the original AP, and if the inquiry response message is not received within a predetermined period, which indicates that the original AP has not received the response inquiry message, then the retransmitting and stopping unit S16 informs the inquiring unit S13 to continue to transmit the response inquiry message to the original AP. Where the number of times for transmitting the response inquiry message to the original AP is determined by the specific requirements or by simulation. If the inquiry response message is received within the predetermined period, which indicates that the original AP has received the response inquiry message, then the retransmission is stopped by the retransmitting and stopping unit.

Corresponding, an inquiring response unit S33 is added in the original AP for transmitting the inquiry message to the MS and for informing the response message unit S32 that the response inquiry message transmitted by the MS is received after having transmitted the inquiry message to the MS.

The above embodiments are presented merely as the preferred embodiments, and are by no means intended to limit the scope of the present invention; therefore, any modification, equivalent substitution, refinements, etc., as long as it is within the scope of the spirit and principles of the present invention, would fall within the scope of protection of the present invention.

The system also includes permanent or removable storage, such as magnetic and optical discs, RAM, ROM, etc. on which the process and data structures can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for scanning in a radio communication system, comprising:
    transmitting by a mobile station (MS) on all channels a probe message containing an Internet Protocol IP address of the original access point (AP) of the mobile station MS and a medium access control (MAC) address of the mobile station MS; switching to an original channel;
    transmitting a response inquiry message to the original AP, and receiving a probe response message within a predetermined period;
    transmitting by the AP, if the AP of the probe message received on said channel is not said original AP, a probe message containing said MAC address to said original AP according to said IP address;
    buffering by said original AP of the probe response message received, and transmitting by the AP of the probe response message to the MS according to said MAC address after the response inquiry message sent by the MS has been received;
    receiving, by the original AP, of the response inquiry message transmitted by the MS and transmitting an inquiry response message to the MS; and
    retransmitting, if the inquiry response message from the original AP is not received by the MS within the predetermined period, the response inquiry message by the MS to the original AP.

2. The method as claimed in claim 1, further comprising: buffering by said original AP, if the AP of the probe message received on said channel is said original AP, of the probe response message generated thereby, and transmitting by said original AP of the probe response message to the MS according to the MAC address after the response inquiry message sent by the MS has been received.

3. The method as claimed in claim 1, further comprising: selecting, by the MS, of an AP corresponding to a channel with the best signal quality as a new AP based on signal quality information in the probe response message.

4. The method as claimed in claim 3, wherein said signal quality information includes signal strength or a signal to noise ratio.

5. The method as claimed in claim 1, further comprising: stopping, if the number of times for the MS to transmit the response inquiry message reaches a predetermined value, the transmitting of the response inquiry message.

6. A system for scanning in a radio communication system, comprising a mobile station (MS);
    an original access point (AP) of the MS; and
    another AP to be probed, and
    wherein said MS comprises:
    a probe message transmitting unit transmitting on all channels a probe message containing an Internet Protocol (IP) address of the original AP of the MS and a medium access control (MAC) address of the MS;
    a switching unit switching to an original channel after the probe message has been transmitted on all the channels,
    an inquiry unit transmitting a response inquiry message to the original AP on the original channel; and
    a probe response message receiving unit receiving a probe response message within a predetermined period;
    wherein said original AP of the MS comprises:
    a storage unit buffering the probe response message; and
    a response message unit transmitting the probe message to the MS according to said MAC address after receiving the response inquiry message sent by the MS, and
    wherein said another AP probed comprises:
    a probe message receiving unit receiving the probe message containing the IP address of the original AP of the MS and the MAC address of the MS transmitted by the MS; and
    a probe response message unit transmitting the probe response message containing said MAC address to the original AP of the MS according to said IP address,
    wherein the original AP of said MS further comprises an inquiry response unit, said MS further comprises a retransmitting and stopping unit, said inquiry response unit transmitting the inquiry response message to the MS after the response inquiry message transmitted by the MS has been received, and said retransmitting and stopping unit retransmitting the response inquiry message to the original AP if the inquiry response message from the original AP has not been received within the predetermined period.

7. The system as claimed in claim 6, wherein said MS further comprises:
    a new AP selecting unit selecting the AP probed having the best signal quality as the new AP according to signal quality information in the probe response message.

8. The system as claimed in claim 7, wherein said signal quality information comprises signal strength or a signal to noise ratio.

9. The system as claimed in claim 6, wherein said retransmitting and stopping stops the transmitting of the response inquiry message if the number of the times of transmitting the response inquiry message reaches a predetermined value.

10. The system as claimed in claim 6, wherein said radio communication system is a wireless local area network.

* * * * *